United States Patent
Goulko et al.

(10) Patent No.: US 9,405,785 B2
(45) Date of Patent: *Aug. 2, 2016

(54) ONLINE PROPAGATION OF DATA UPDATES

(71) Applicant: International Business Machines Corporation, Armonk, NY (US)

(72) Inventors: Igor Goulko, Point Cook (AU); Galina Rubinshtein, Holon (IL); Marjorie Schejter, Nes Ziona (IL); Uri Segev, Savyon (IL)

(73) Assignee: International Business Machines Corporation, Armonk, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/940,897

(22) Filed: Jul. 12, 2013

(65) Prior Publication Data
US 2013/0304696 A1 Nov. 14, 2013

Related U.S. Application Data

(63) Continuation of application No. 11/422,203, filed on Jun. 5, 2006, now Pat. No. 8,515,929.

(51) Int. Cl.
*G06F 17/30* (2006.01)

(52) U.S. Cl.
CPC .... *G06F 17/30345* (2013.01); *G06F 17/30377* (2013.01)

(58) Field of Classification Search
CPC ................................................. G06F 17/30575
See application file for complete search history.

(56) References Cited

U.S. PATENT DOCUMENTS

| | | | |
|---|---|---|---|
| 8,359,594 B1 * | 1/2013 | Davidson | G06F 9/5077 709/218 |
| 2001/0002469 A1 | 5/2001 | Bates et al. | |
| 2002/0032708 A1 * | 3/2002 | Gupta et al. | 707/539 |
| 2002/0049751 A1 | 4/2002 | Chen et al. | |
| 2002/0138447 A1 | 9/2002 | Dutta | |
| 2002/0156798 A1 * | 10/2002 | Larue et al. | 707/201 |
| 2002/0161771 A1 | 10/2002 | Boshko | |
| 2003/0110280 A1 | 6/2003 | Hinchliffe et al. | |
| 2003/0223429 A1 * | 12/2003 | Bi et al. | 370/395.4 |
| 2004/0225525 A1 | 11/2004 | Weitzman | |
| 2007/0027930 A1 | 2/2007 | Alvarado et al. | |

OTHER PUBLICATIONS

U.S. Appl. No. 11/422,203, Office Action dated Mar. 18, 2008.
U.S. Appl. No. 11/422,203, Office Action dated Aug. 20, 2008.
U.S. Appl. No. 11/422,203, Office Action dated Dec. 15, 2008.
U.S. Appl. No. 11/422,203, Office Action dated Jun. 11, 2009.
U.S. Appl. No. 11/422,203, Examiner's Answer dated Jan. 19, 2010.
U.S. Appl. No. 11/422,203, Notice of Allowance dated Apr. 12, 2013.

* cited by examiner

*Primary Examiner* — Aleksandr Kerzhner
*Assistant Examiner* — Matthew Ellis
(74) *Attorney, Agent, or Firm* — Edward Choi; Hoffman Warnick LLC

(57) ABSTRACT

Various embodiments include a system for online propagation of data updates. The system can include: a computer system for storing a plurality of records; and a record update utility configured to: initiate a record update process for any of the records responsive to a modification of a trigger data item, wherein the process is performed while the system is online; create an update process timestamp indicating a time at which the record update process is begun; and determine if a last-modified timestamp associated with any of the records indicates an earlier time than the update process timestamp, and, if so: update the record to reflect the modification to the trigger data item, and modify the last-modified timestamp to reflect a time that is later than the update process timestamp.

14 Claims, 2 Drawing Sheets

ONLINE PROPAGATION OF DATA UPDATES

CROSS-REFERENCE TO RELATED APPLICATIONS

This application is a continuation of U.S. patent application Ser. No. 11/422,203, which received a Notice of Allowance on Apr. 12, 2013, and is incorporated herein by reference in its entirety.

FIELD OF THE INVENTION

The present invention relates to computer processing in general, and more particularly to online propagation of data updates.

BACKGROUND OF THE INVENTION

In computer systems changes to data in one record often affect data in other records, requiring that the affected records be updated. For example, in the IBM Lotus Sametime™ system, when one Sametime™ user changes his/her name in his/her user profile record, other Sametime™ records where the user's old name still appears must be changed to reflect the user's new name. This includes, for example, address books, buddy lists, and privacy lists of other Sametime™ users where the user's name appears. In order to accomplish this while maintaining data consistency, the Sametime™ system administrator must currently take the Sametime™ system offline and run a Name Conversion Utility to update all affected records. Thus, the Sametime™ system is inaccessible during such an update.

SUMMARY OF THE INVENTION

The present invention discloses a system and method for propagating data updates while a system is online by employing a record update utility which uses timestamps and flexible update prioritization to update records while maintaining data consistency.

In one aspect of the present invention a method is provided for online propagation of data updates, the method including initiating a record update process for any of a plurality of records in a system responsive to a modification of a trigger data item, where the process is performed while the system is online, creating an update process timestamp indicating the time at which the record update process is begun, and determining if a last-modified timestamp associated with any of the records indicates an earlier time than the update process timestamp, and, if so updating the record to reflect the modification to the trigger data item, and modifying the last-modified timestamp to reflect a time that is later than the update process timestamp.

In another aspect of the present invention a system is provided for online propagation of data updates, the system including a computer system for storing a plurality of records, and a record update utility configured to initiate a record update process for any of the records responsive to a modification of a trigger data item, where the process is performed while the system is online, create an update process timestamp indicating a time at which the record update process is begun, and determine if a last-modified timestamp associated with any of the records indicates an earlier time than the update process timestamp, and, if so update the record to reflect the modification to the trigger data item, and modify the last-modified timestamp to reflect a time that is later than the update process timestamp.

In another aspect of the present invention a computer-implemented program embodied on a computer-readable medium is provided, the computer program including a code segment operative to initiate a record update process for any of a plurality of records in a system responsive to a modification of a trigger data item, where the process is performed while the system is online, a code segment operative to create an update process timestamp indicating a time at which the record update process is begun, and a code segment operative to determine if a last-modified timestamp associated with any of the records indicates an earlier time than the update process timestamp, and, if so update the record to reflect the modification to the trigger data item, and modify the last-modified timestamp to reflect a time that is later than the update process timestamp.

Various additional aspects include a system for online propagation of data updates, the system comprising: a record update utility configured to: initiate a record update process for any of the plurality of records in a system responsive to a modification of a trigger data item, wherein the process is performed while the system is online; create an update process timestamp indicating a time at which the record update process is begun; and determine if a last-modified timestamp associated with any of the records indicates an earlier time than the update process timestamp, and, if so: updating the record to reflect the modification to the trigger data item, wherein update priority is given to all of the records associated with a user who logs into a computer system after the record update process has begun on the computer system; and modifying the last-modified timestamp to reflect a time that is later than the update process timestamp.

BRIEF DESCRIPTION OF THE DRAWINGS

The present invention will be understood and appreciated more fully from the following detailed description taken in conjunction with the appended drawings in which.

DETAILED DESCRIPTION OF THE INVENTION

Figure 1A:
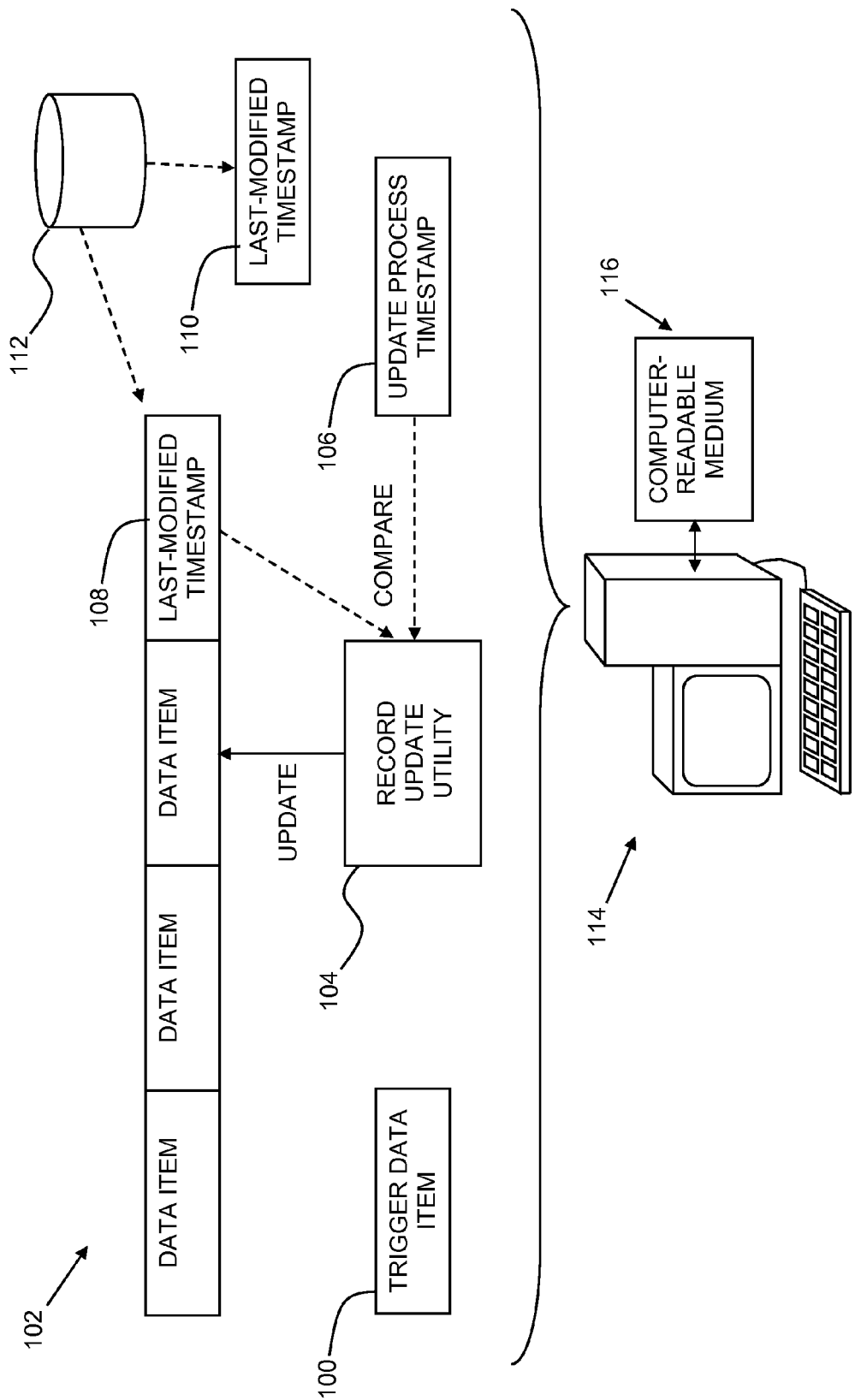
FIG. 1A, is a simplified conceptual illustration of a system for online propagation of data updates, constructed and operative in accordance with an embodiment of the present invention.
Figure 1B:
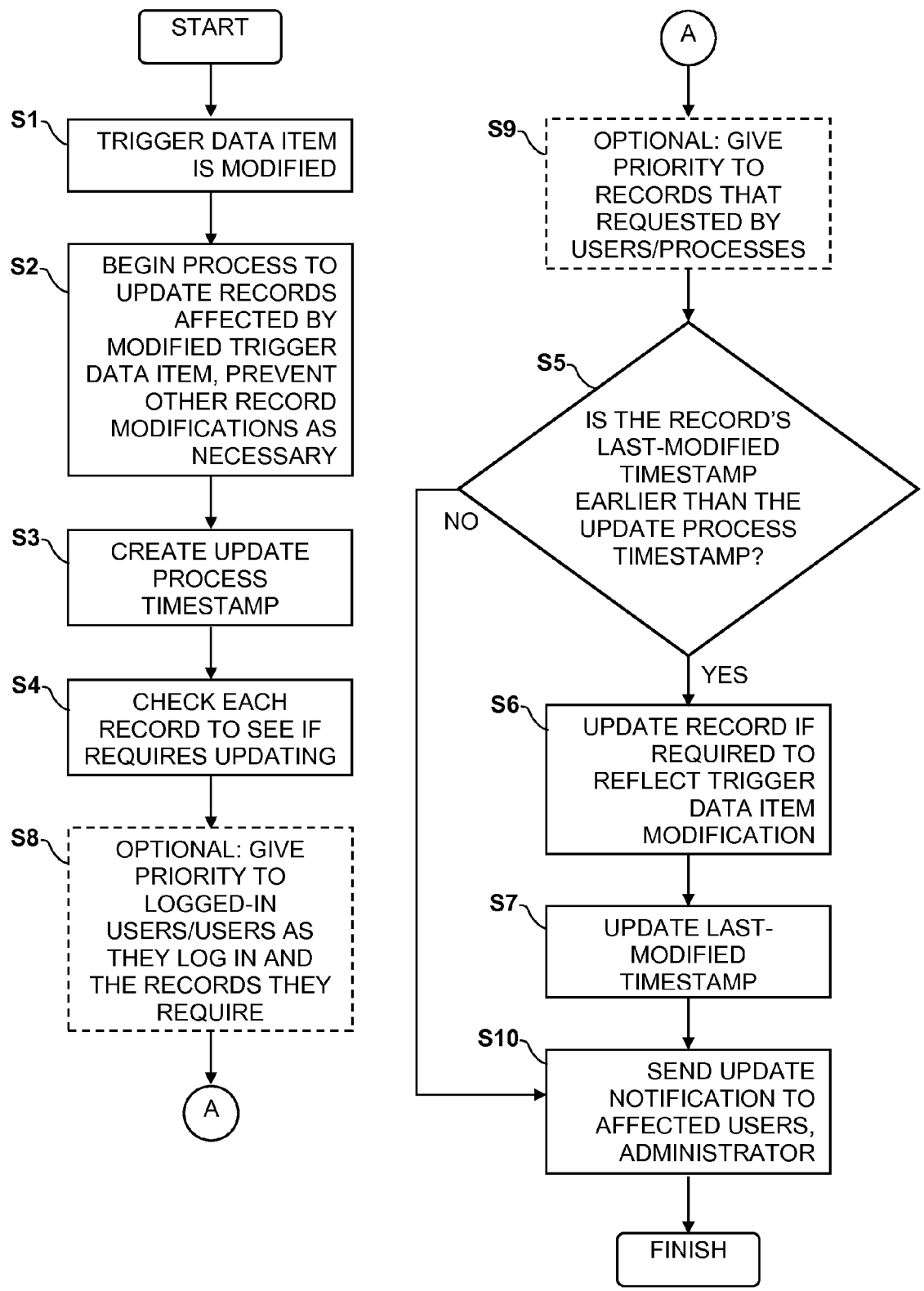
FIG. 1B is a simplified flowchart illustration of an exemplary method of operation of the system of FIG. 1A, operative in accordance with an embodiment of the present invention.

Reference is now made to FIG. 1A, which is a simplified conceptual illustration of a system for online propagation of data updates, constructed and operative in accordance with an embodiment of the present invention, and additionally to FIG. 1B, which is a simplified flowchart illustration of an exemplary method of operation of the system of FIG. 1A, operative in accordance with an embodiment of the present invention. In the system and method of FIGS. 1A and 1B, given a modification to a "trigger" data item 100 (step S1), being a data item whose modification requires that one or more records 102 be updated, a record update process is begun (step S2) by running a record update utility 104 which creates a timestamp 106 (step S3) indicating the time at which the record update process is begun. Each record 102 is preferably examined (step S4) to determine the last time the record was modified for any reason. This information may be indicated by a "last modified" timestamp 108 that is maintained for record 102. If the record's last-modified timestamp 108 indicates an earlier time than update process timestamp 106 (step S5), record 102 is updated (step S6) as required to reflect the modification to trigger data item 100. Whether or not record 102 requires updating, the record's last-modified timestamp 108 is updated (step S7) to reflect a time that is later than update process timestamp 106 to avoid processing the same record twice during a single record update process. Where last-modified timestamps 108 are not maintained for each record 102, a last-modified timestamp 110 may be maintained for an entire database 112 in which record 102 resides, indicating the last time that any record 102 in database 112 was modified. Thus, if the database's last-modified timestamp 110 indicates an earlier time than update process timestamp 106, all records 102 in database 112 that are affected by the modification to trigger data item 100 are updated to reflect the modification to trigger data item 100, and the database's last-modified timestamp 110 is updated to reflect a time that is later than update process timestamp 106. It is appreciated that any of the elements referred to herein may reside on or be otherwise accessible to a computer system 114 as shown.

Record update utility 104 may give priority (step S8) to a user A who logs in to computer system 114 after the record update process has begun, whereby records 102 associated with user A that require updating (e.g., user A's buddy list is updated to reflect a name change of one of his buddies), are updated before other records 102. The record update process may likewise give priority (step S9) to users who are already logged in to computer system 114 when the record update process is begun, whereby records 102 associated with users who are logged in and that require updating are updated before other records 102 of users who are not currently logged in. Alternatively, the record update process may perform on-demand updates in response to requests for records 102 that require updating.

Where a user or a process wishes to modify a record 102 after the record update process has begun, the modification is preferably withheld until after record update utility 104 has examined record 102. This is to prevent a situation where a record whose last-modified timestamp 108 indicates an earlier time than update process timestamp 106, and that is to be examined and possibly updated by record update utility 104, from having its last-modified timestamp 108 changed before it is processed by record update utility 104, which would result in record update utility 104 not examining record 102 and not considering updating record 102 to reflect the trigger data item 100 modification.

A notification may also be sent (step S10) informing a user that records to which the user has access are about to be examined for possible updating and/or have been examined/updated. Additionally or alternatively, the notification may describe the nature of the update (e.g., "Jane Doe has changed her name to Jane Smith. Her entry in your buddy list has just been updated."). Similarly, the notification may be sent informing a system administrator that the record update process has begun and/or has completed, as well as whether all records 102 were updated successfully or whether any processing failures were encountered.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While shown and described herein as a system and method for the online propagation of data updates, it is understood that the invention further provides various alternative embodiments. For example, in one embodiment, the invention provides a computer-readable medium 116 that includes program code (e.g., a computer program) to enable the computer system 114 to provide online propagation of data updates as described above. It is understood that the term "computer-readable medium" comprises one or more of any type of physical embodiment of program code. In particular, the computer-readable medium can comprise program code embodied on one or more portable storage articles of manufacture (e.g., a compact disc, a magnetic disk, a tape, etc.), on one or more data storage portions of a computer system (e.g., a fixed disk, a read-only memory, a random access memory, a cache memory, etc.), and/or as a data signal traveling over a network (e.g., during a wired/wireless electronic distribution of the computer program).

In another embodiment, the invention provides a business method that performs the process steps of the invention on a subscription, advertising, and/or fee basis. That is, a service provider could offer to provide for the online propagation of data updates in accordance with the present invention. In this case, the service provider can create, maintain, support, etc., a computer infrastructure, such as the computer system 114, that performs the process steps of the invention for one or more customers. In return, the service provider can receive payment from the customer(s) under a subscription and/or fee agreement and/or the service provider can receive payment from the sale of advertising space to one or more third parties.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for online propagation of data updates, the system comprising:
    a computer system for storing a plurality of records; and
    a record update utility configured to:
        initiate a record update process for any of the plurality of records responsive to a modification of a trigger data item, wherein the process is performed while the system is online;
        create an update process timestamp indicating a time at which the record update process is begun; and
        determine if a last-modified timestamp associated with any of the records indicates an earlier time than the update process timestamp, and, in response to the determination that the last-modified timestamp indicates an earlier time than the update process timestamp:
            update the record to reflect the modification to the trigger data item, wherein update priority is given to all of the records associated with a user who logs into the computer system after the record update process has begun on the computer system; and
            modify the last-modified timestamp to reflect a time that is later than the update process timestamp.

2. The system according to claim 1, wherein the last-modified timestamp is maintained for an entire database in which any of the records reside, indicating the last time that any of the records in the database was modified.

3. The system according to claim 2, wherein the record update utility is configured to update all records in the database that are affected by the modification to the trigger data item in response to determining that the database's last-modified timestamp indicates an earlier time than the update process timestamp.

4. The system according to claim 1, wherein a request to modify any of the records that is received after the record update process has begun is withheld until after the record has been updated.

5. The system according to claim 1, wherein a request to modify any of the records that is received after the record update process has begun is withheld until after the record update process has finished.

6. The system according to claim 1, wherein the record update utility is configured to send any of the following notifications:
- a notification informing a user that any of the records to which the user has access is about to be updated;
- a notification informing a user that any of the records to which the user has access has been updated; and
- a notification describing the nature of an update to any of the records.

7. A computer-implemented program embodied on a non-transitory computer-readable storage medium, the computer program comprising:
- a code segment operative to initiate a record update process for any of a plurality of records in a system responsive to a modification of a trigger data item, wherein the process is performed while the system is online;
- a code segment operative to create an update process timestamp indicating a time at which the record update process is begun; and
- a code segment operative to determine if a last-modified timestamp associated with any of the records indicates an earlier time than the update process timestamp, and, in response to the determination that the last-modified timestamp indicates an earlier time than the update process timestamp:
  - update the record to reflect the modification to the trigger data item, wherein update priority is given to all of the records associated with a user who logs into the computer system after the record update process has begun on the computer system; and
  - modify the last-modified timestamp to reflect a time that is later than the update process timestamp.

8. The computer-implemented program according to claim 7, wherein the last-modified timestamp is maintained for an entire database in which any of the records reside, indicating the last time that any of the records in the database was modified, and wherein the record update utility is configured to update all records in the database that are affected by the modification to the trigger data item in response to determining that the database's last-modified timestamp indicates an earlier time than the update process timestamp.

9. The computer-implemented program according to claim 7, wherein a request to modify any of the records that is received after the record update process has begun is withheld until after the record has been updated.

10. The computer-implemented program according to claim 7, wherein a request to modify any of the records that is received after the record update process has begun is withheld until after the record update process has finished.

11. The computer-implemented program according to claim 7, wherein the record update utility is configured to send any of the following notifications:
- a notification informing a user that any of the records to which the user has access is about to be updated;
- a notification informing a user that any of the records to which the user has access has been updated; and
- a notification describing the nature of an update to any of the records.

12. A system for online propagation of data updates, the system comprising:
- a record update utility configured to:
  - initiate a record update process for any of the plurality of records in a system responsive to a modification of a trigger data item, wherein the process is performed while the system is online;
  - create an update process timestamp indicating a time at which the record update process is begun; and
  - determine if a last-modified timestamp associated with any of the records indicates an earlier time than the update process timestamp, and, in response to the determination that the last-modified timestamp indicates an earlier time than the update process timestamp:
    - updating the record to reflect the modification to the trigger data item, wherein update priority is given to all of the records associated with a user who logs into a computer system after the record update process has begun on the computer system; and
    - modifying the last-modified timestamp to reflect a time that is later than the update process timestamp.

13. The system according to claim 12, wherein the determining includes determining where the last-modified timestamp is maintained for an entire database in which any of the records reside, indicating the last time that any of the records in the database was modified.

14. The system according to claim 13, wherein the updating includes updating all records in the database that are affected by the modification to the trigger data item in response to determining that the database's last-modified timestamp indicates an earlier time than the update process timestamp.

* * * * *